United States Patent [11] 3,595,082

| [72] | Inventor | Park H. Miller, Jr. |
| | | Del Mar, Calif. |
| [21] | Appl. No. | 531,985 |
| [22] | Filed | Mar. 4, 1966 |
| [45] | Patented | July 27, 1971 |
| [73] | Assignee | Gulf Oil Corporation |

[54] TEMPERATURE MEASURING APPARATUS
8 Claims, 7 Drawing Figs.

[52] U.S. Cl. .................................................. 73/339 A,
235/181
[51] Int. Cl. .......................................... G01k 11/24
[50] Field of Search ......................................... 73/339 A,
339; 181/0.5 B; 235/181

[56] References Cited
UNITED STATES PATENTS
2,629,000  2/1953  Olson et al. ................. 181/0.5 (B) X
2,840,308  6/1958  Van Horne ............. ....... 235/181
2,872,996  2/1959  Runge ..... .... 235/181 X
2,897,351  7/1959  Melton ........... ......... 235/181 UX
2,927,656  3/1960  Feagin et al. ................ 235/181 X
2,989,726  6/1961  Crawford et al. ............. 235/181 UX
3,081,457  3/1963  Di Toro ....................... 235/181 X
3,137,169  6/1964  Clement et al. ............... 73/339 (AC)
3,350,942  11/1967  Peltola ......................... 73/339 (AC)

Primary Examiner—Louis R. Prince
Assistant Examiner—Frederick Shoon
Attorney—Anderson, Luedeka, Fitch, Even and Tabin ABSTRACT: A method and apparatus for measuring temperature under difficult environmental conditions, in which the temperature of a fluid between two reflective means is determined acoustically by recording the received reflections and determining their spacing by pulse compression techniques.

PATENTED JUL 27 1971

Inventor
PARK H. MILLER JR.

BY Anderson, Luedeka,
Fitch, Even, & Tabin
Attys.

TEMPERATURE MEASURING APPARATUS

This invention relates to apparatus for measuring temperature and, more particularly, to an acoustic thermometer which is capable of accurately measuring temperatures under difficult environmental conditions.

U.S. Pat. applications Ser. No. 65,694, now Pat. No. 3,214,976 and Ser. No. 106,120, now Pat. No. 3,214,977, both assigned to the assignee of the present invention, describe acoustic thermometers for accomplishing accurate measurements of extreme temperatures, of the order of 2,000°F. Such a thermometer measures temperature by producing sound waves having known characteristics and by determining the effect on such characteristics when the sound waves are passed through the environment of which the temperature is to be determined. The acoustic thermometers described in these applications are not detrimentally affected by adverse environmental conditions such as high temperatures, nuclear radiation induced transformations and the like. As a result, temperature measurements accomplished with such thermometers are sufficiently accurate that correction of readings by compensation factors, or verification of readings by additional measurements are not required.

In both of the foregoing applications, a sonic signal of varying frequency is transmitted to a gas filled resonant cavity and the amplitude of returning signals is observed. When the frequency at which the cavity is resonant is established by observing the frequency at which maximum amplitude signals are returned, the temperature of the gas in the cavity may be determined in accordance with known relationships.

The present invention is also an acoustic thermometer, but employs a different principle of operation and distinct structural differences from the devices of the two applications cited, as will be subsequently described. The acoustic thermometer of the present invention is particularly suitable for difficult environmental conditions including adverse noise conditions and situations wherein the available space is limited, such as might be the case in connection with temperature measurements in nuclear reactors. It is also desirable in some circumstances that an acoustic thermometer readily lend itself to automatic temperature recording techniques.

It is an object of this invention to provide improved method and apparatus for measuring temperature.

Another object of the invention is to provide an acoustic thermometer which is capable of successful use under adverse noise conditions.

Still another object of the invention is to provide an improved method for acoustically measuring temperature under adverse noise conditions.

It is another object of the invention to provide an acoustic thermometer which readily lends itself to automatic recording of temperature.

A further object of the invention is to provide temperature measuring apparatus which is suitable for use where available space is limited, such as in a nuclear reactor.

Other objects and the various advantages of the invention will become apparent to those skilled in the art from the following description taken in connection with the accompanying drawings wherein.

In accordance with the invention, the temperature measuring system includes a tube defining a sound conducting passage having two discontinuities. The discontinuities are spaced a predetermined distance apart and produce reflections of sound waves traveling in the passage. A transducing device is connected to one end of the tube for producing intermittent sound wave pulses in the passage. Each of the pulses produced by the transducing device is reflected by each of the discontinuities in the tube and such reflections are received by the transducing device prior to the production thereby of the next succeeding pulse. Electronic apparatus is connected to the transducing device and is responsive to the receipt of reflections thereby produced by the discontinuities in the tube to provide an indication of the time interval between the reflections. The temperature in the passage between the discontinuities can therefore be determined in accordance with known relationships. Under adverse noise conditions, the electronic apparatus is constructed to compress or autocorrelate the received reflections to eliminate the effect of the noise.

Figure 1:
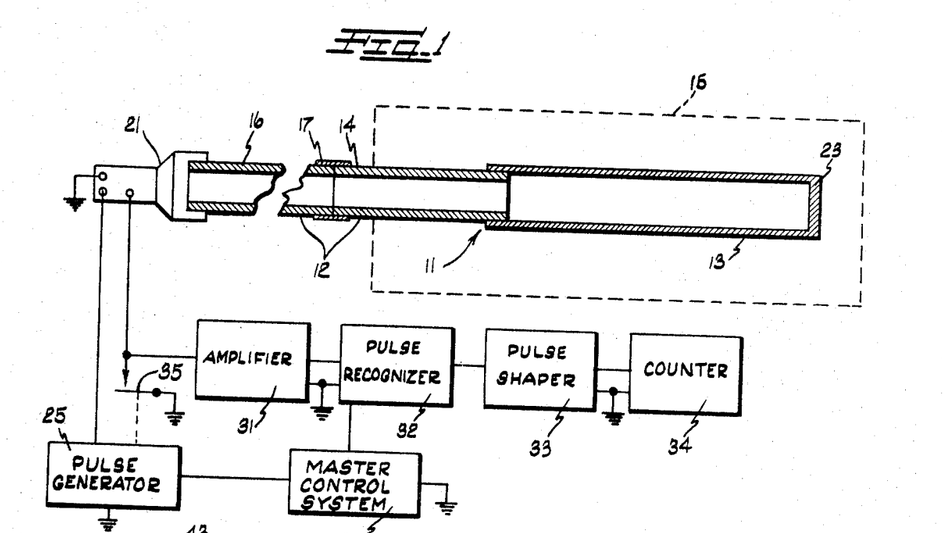
FIG. 1 is a partially schematic diagram and partially full section view of temperature measuring apparatus constructed in accordance with the invention.

Referring more particularly to FIG. 1, an acoustic thermometer constructed in accordance with the invention is shown. It is known that the velocity of sound in a fluid may be determined in accordance with the equation $$V = \sqrt{\frac{RT\gamma}{M}}, \text{ where:}$$

$V =$ the velocity of sound in a fluid medium;
$\gamma =$ the ratio of the specific heat of the fluid at constant pressure to the specific heat of the fluid at constant volume (specific heat ratio);
$R =$ the universal gas constant;
$T =$ absolute temperature; and
$M =$ the molecular weight of the fluid medium.

From the above relationships, it will be seen that the temperature of a given fluid medium may be determined, when the velocity of sound therein is known, from the equation $$T = V^2 M/\gamma R$$

Accordingly, the temperature in the tube may be readily determined, when a known fluid fills the tube, from a determination of the velocity of sound in the fluid.

A preferred form of acoustic thermometer in accordance with the principles outlined above includes a hollow cylindrical tube or conduit 11. Tube 11 is comprised of a first section 12 and a second section 13, joined end to end in coaxial alignment. The section 13 is disposed within the region defined by the dotted lines 15 in order to measure the temperature in such region. The region defined by the dotted lines could be, for example, high-temperature furnace or the core of a nuclear reactor. For high-temperature measurement and gas containment, the tube 11, and particularly section 13 thereof, should be composed of a nonporous refractory material such as nonporous graphite. The sections 12 and 13 of tube 11 may be joined by a suitable gastight fitting (not shown). Section 12 of tube 11 is comprised of two parts 14 and 16. Part 14 should be of material similar to that used in section 13 to resist high temperatures, whereas part 16 may be of a structural material such as copper. The two parts of section 12 are joined by a sealing sleeve 17. The tube 11 is filled with a gas at a predetermined pressure. The gas should be one for which the sound conducting properties are well known, and should be chemically inert at the temperatures being measured. Helium has been found to be a satisfactory gas for this purpose.

The tube 11 serves to define a passage for conducting sound waves produced by a transducer 21 maintained in gastight relation to the end of section 12 opposite the end thereof joined to section 13. The end 23 of section 13 opposite the end thereof joined to section 12 is closed so that the section 13 forms a cavity. The inner diameters of sections 12 and 13 are substantially different. The result of the described construction is that two discontinuities are provided in the tube which cause reflections of sound waves produced by transducer 21 traveling in the passage defined by the tube. One of these discontinuities is, of course, the end 23, whereas the other discontinuity occurs at the junction between sections 12 and 13 due to the differing inner diameters of such sections.

Transducer 21 serves to produce sound wave pulses in accordance with electrical pulses applied thereto by a pulse generator 25. Pulse generator 25 may be any known signal generating device which is suitable to produce the particular pulse desired. Four types of pulses which pulse generator 25 may be designed to produce are discussed below. These sound wave pulses travel through the gas along the length of the passage defined by tube 11 and a reflection thereof occurs at the junction between sections 12 and 13. A further reflection occurs when the sound wave pulse arrives at the closed end 23 of section 13. The two reflections will be opposite in phase, and the diameters of sections 13 and 12 are selected so that the two reflections will be of approximately equal amplitude. Preferably, the ratio of the cross-sectional areas of the hollow portion of section 13 to the hollow portion of section 12 is of the order of two to one. It is also preferred that the tube 11, and in particular the section 13 thereof, be designed to provide a gas-filled cavity having very low Q to avoid, as much as possible, spurious reflections and reverberations.

Transducer 21, in addition to producing sound wave pulses traveling inside of tube 11, also serves to receive sound from the tube 11 and in particular to receive the reflections produced by the two discontinuities in tube 11. The transducer 21 produces electrical signals corresponding to the received sound waves. Transducer 21 may be of a suitable type known in the art and may comprise, for example, a diaphragm actuated by a piezoelectric crystal. Electronic apparatus is connected to transducer 21 in order to provide an indication of the time interval between the reflections. Such apparatus includes an amplifier 31, a pulse recognizer 32, a pulse shaper 33 and a counter 34, all series connected in the stated order from the transducer 21. A gate 35 is controlled by pulse generator 25 and closes during the time period in which transducer 21 is producing a sound wave pulse. This shunts out amplifier 31 and prevents actuation of the counter. When transducer 21 has completed producing the sound wave pulse, gate 35 is opened and the amplifier 31 is ready to amplify the reflections. The interval between the end of one pulse and the beginning of the next is selected to allow both reflections to be received by transducer 21 before the production of the next succeeding pulse.

Selection of the particular type of pulse to be produced by transducer 21 will depend upon the environmental conditions of the system. One particular scheme has advantage when the thermometer is used under adverse noise conditions which would obscure the actual reflections to such a degree that the interval between them is difficult to determine. In this scheme, each pulse is comprised of a wave train of a different frequency. A plurality of individual pulses of different frequencies are sent down the tube, one at a time. The two reflections are received before the succeeding pulse is sent. The two reflections produced by each pulse are detected by a filter which is tuned to that frequency. The outputs of the filter for all frequencies are then combined or "compressed" in a particular manner to sharpen the reflections to render their points in time readily determinable despite the presence of obscuring noise.

Because the wave train of which each reflection is comprised is of finite length, the output of its corresponding filter gradually increases, reaching a peak corresponding in time to the time of the last wave of the train and thereafter gradually diminishing. Thus, the output of each filter will theoretically reach two peaks, each corresponding to one of the two reflections. Actually, noise may obscure these peaks. The outputs of the filter, each of a different frequency, are recorded and then combined in such a manner that the signals are substantially in phase at the time of the last wave of each wave train. At all times other than the time of the last wave, the combined outputs cancel one another, thus providing a combined signal which is substantially zero except for a sharp pulse representing each reflection. The time interval between the sharp pulses of the combined signal will represent the time interval between the two reflections of each pulse produced by the two discontinuities in conduit 11.

Figure 2:
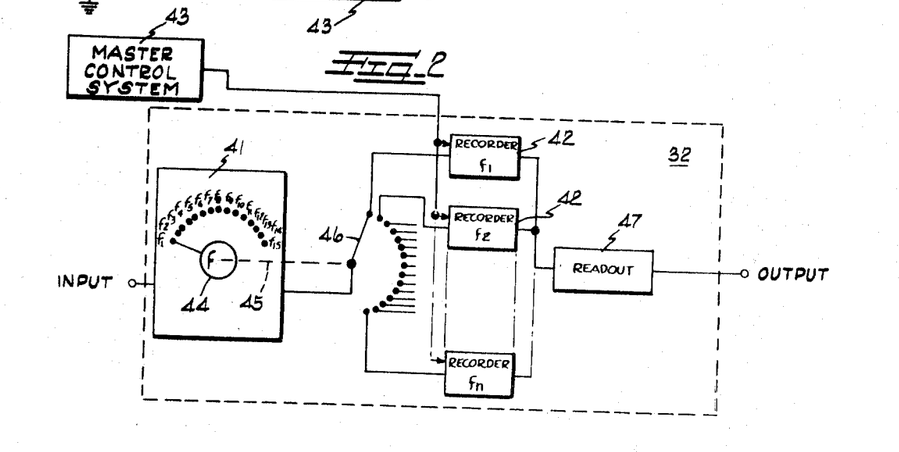
FIG. 2 is a more detailed schematic diagram of part of the apparatus of FIG. 1.

In FIG. 2, a type of pulse recognizer for accomplishing the foregoing pulse compression is shown in detail. The input signals to the pulse recognizer 32 produced by transducer 21 in response to the reflections received thereby are applied to a variable filter 41, which may be narrowly tuned to pass waves of the particular frequency of the reflections received by transducer 21 for each pulse. The signal passed by the variable filter 41 is then recorded on a corresponding one of a plurality of recorders 42. In order that the record made on recorder 42 be related to a reference datum, the recorder cycle is related to a master control system 43, either by having the master control system start the recorder time or by having the recorder cyclical, as by using a rotating magnetic drum recorder and starting the operation of the master control system at a particular time in the recorder cycle, as by using a microswitch at a particular point on the drum of a recorder. In any event, in some convenient and conventional manner, the time of the record made upon the recorder 30 may be related to a reference datum, for example, the initiation of the pulse by the pulse generator, and thus provide a record of received waves as a function of time related to a reference datum. For each frequency as controlled by the master control system 43, a frequency control switch 44 switches components in the multiple filter 41 to tune the filter to that frequency. At the same time, the frequency control switch is ganged by a shaft 45 to a switch 46 which functions to switch the output of the filter 41 to a recorder 42 which then records the signal for the respective selected frequency. The result is that the reflections at each frequency are recorded on a respective recorder 42. In fact, each recorder 42 may be a separate track on a single magnetic recording drum. Alternatively a single microtrack recording head may be employed and between each successive frequency it is moved over by a distance about equal to the width of the microtrack head. The records as recorded on each of the recorders 42 are combined by a readout device 47, which may be a single pickup head covering all the recording tracks of the drum of the recorder.

Inasmuch as each record is a measure of the detected reflections as a function of time related to a reference datum, e.g., the time of the initiation of a pulse in the transducer at a respective frequency, the records may be arranged so that the reference data coincide and the records then combined.

It has been found preferable to utilize as a filter a so-called operational filter in the form of a narrow band active filter having adjustable frequency and Q controls. The filter is based upon the analog simulation of the differential equation of a damped linear oscillator that is excited by an input signal of the resonant frequency. The frequencies and Q controls are adjusted to provide a filter response approximating the correlation function for the particular wave train frequency and length to which the filter is tuned. The differential equation is:

$$\frac{d^2x}{dt^2} + \frac{\omega}{Q}\frac{dx}{dt} + \omega^2 x = \omega^2 F(t)$$

where: $F(t)$ is the input function which contains a desired reflection signal characterized by the effective resonant filter frequency mixed with varying amounts of noise.

This converts to $$\frac{1}{\omega}\frac{d^2x}{dt^2} = [F(t) - x]\omega - \frac{1}{Q}\frac{dx}{dt}$$

Figure 3:
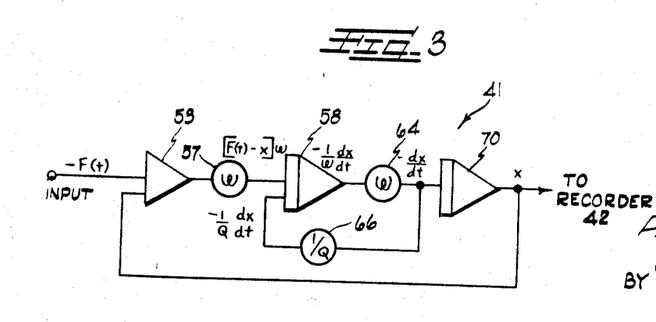
FIG. 3 is a functional illustration of a filter used in the apparatus of FIG. 2.

Which can be set up in analog form as in FIG. 3.

It should be noted that $\omega$ for a 1,000 c.p.s. signal would be 6,280 while a coefficient potentiometer yields a number only from 0 to 1. For this reason the $\omega$ setting is really $\omega/10,000$ and both such settings are followed by integrators with a gain of 10,000 to compensate. This also keeps the integration capacitors from being excessively large.

Figure 4:
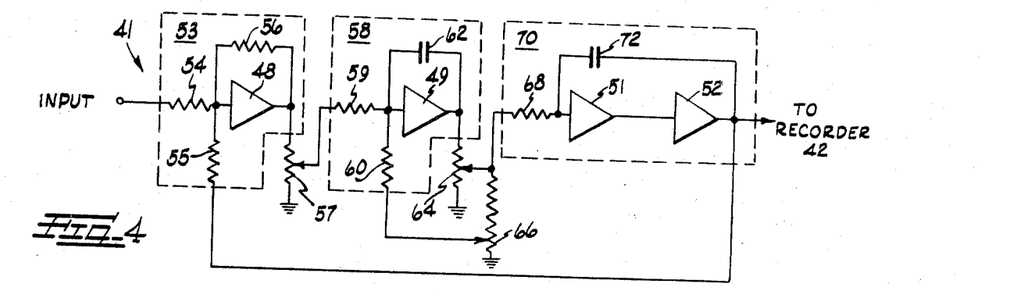
FIG. 4 is a schematic diagram of a preferred form of the filter of FIG. 3.

The basic schematic is preferably as shown in FIG. 4. The filter includes amplifiers 48, 49, 51 and 52. Amplifiers 48, 49 and 51 may be small conventional operational amplifiers having a frequency response of 0 to 50 kc. Amplifier 52 may be a symmetrical emitter follower to provide a low-impedance output. Amplifier 48 is part of a summing amplifier 53 to which an input signal is applied at each of input resistors 54 and 55 and which includes a feedback resistor 56. Potentiometer 57 is a frequency control coupled between the output of summing amplifier 53 and an integrating amplifier 58 having input resistors 59 and 60, amplifier 49 and a feedback capacitor 62. The output of the amplifier 58 is applied to another potentiometer 64 which is also a frequency control. The output from the frequency control 64 is applied to a potentiometer 66 which is a Q control and is also applied through an input resistor 68 which is part of an integrator 70, which also includes amplifiers 51 and 52 and feedback capacitor 72. The signal from the Q control 66 is applied through resistor 60 to integrator 58. The output of the integrator 70 is then the filter output passed to a recorder 42. It is also fed back to an input of the amplifier 53.

The operation of the amplifier may be readily understood by reference to FIG. 3 which is a functional illustration of the filter. The operational filter is normally adjusted so that the buildup of the filter output over the duration of a single idealized reflection and the ringing decay of the filter after the cessation of the signal form an approximately triangular envelope. Amplifier 53 sums its input signals $-F(t)$ and $x$ and inverts the sum to produce a signal $F(t)-x$. Potentiometer 57 (with appropriate amplifier gain) multiplies the sum by $\omega$ to produce a signal $[F(t)-x]\omega$. Integrator 58 adds this signal to a signal representative of $-1/Q\,dx/dt$ to produce a signal $[F(t)-x]\omega-1/Q\,dx/dt$, which as noted above is equal to $1/\omega d^2x/dt^2$; integrator 58 then integrates this to produce a signal $-1/\omega\,dx/dt$ which is multiplied by $\omega$ by potentiometer 64 (with appropriate amplifier gain) to produce a signal representative of $-dx/dt$. This signal is multiplied by $1/Q$ by the Q control potentiometer 66 to provide an input signal for integrator 58. It is also integrated to produce the signal $x$ which is the filter output and also an input signal to amplifier 53.

The filter 41 is tuned by the adjustment of potentiometers 57 and 64. The adjustment may be made by movement of the frequency control switch 44 to provide the appropriate frequencies, or the switch may switch different preset components for potentiometers 57 and 64, the components being preset to provide the predetermined frequencies. The Q control 66 may be similarly adjusted.

The operational filter as described in connection with FIGS. 3 and 4 features independent frequency and Q controls. However, in the case of a system utilizing sets of frequencies and numbers of cycles such that all pulse trains used are of approximately equal time duration (period x number of pulses = constant), it is desirable to use a filter wherein the Q control is proportional to frequency while the frequency control is independent of Q. This can be accomplished by the filter shown in FIG. 5.

Figure 5:
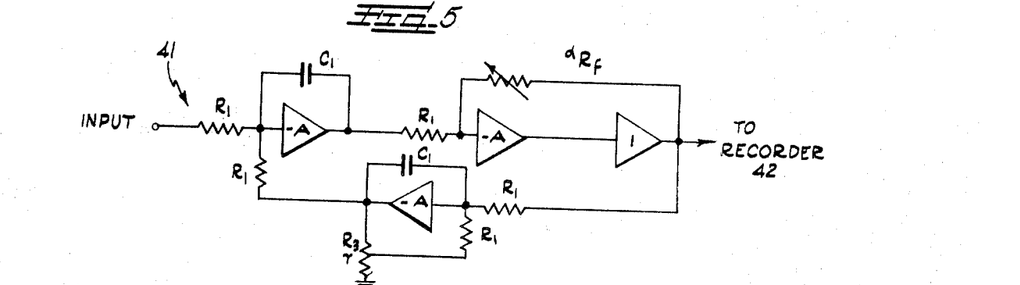
FIG. 5 is a schematic diagram of an alternative form of filter for the apparatus of FIG. 2.

A filter like that shown in FIG. 5 is described in an article by F.T. May and R. A. Dandl, "Active Filter Element and Its Application to a Fourier Comb," REVIEW OF SCIENTIFIC INSTRUMENTS, Apr. 1961, Vol. 32, No. 4, Pg. 387. This circuit requires only a single-frequency control rather than the dual-frequency control of the filter of FIGS. 3 and 4, and provides the desired frequency dependence in the Q control. The bandwidth and gain of this circuit are substantially identical to those of the circuit shown in FIGS. 3 and 4. The pertinent relations are as follows:

$$f \text{ resonance} = \alpha 1/2/2\pi R_1 C_1$$

$$Q = \alpha 1/2/\gamma$$

$$\alpha = R_f/R_1$$

$$\gamma = \text{ratio on } R_3$$

Bandwidth on long wave train $= \gamma/R_1 C_1$

Gain at $f$ resonance on long wave train $= \alpha/\gamma$ The Q, controlled by $\gamma$, need only be set once for a particular time length of pulse train, and the only control requiring switching is the single frequency ($\alpha$) control. Thus, the control $\gamma$ can be adjusted to provide the desired Q, at a particular frequency for a wave train of the length being used, to produce the desired rate of rise and fall in the filter output. This setting of the control $\gamma$ then provides the desired Q for all other frequencies as determined by the control $\alpha$, the Q being also determined by the control $\alpha$ and hence being frequency dependent. This produces a Q that increases with frequency, which is desirable in view of the normal increased attenuation of the higher frequencies in the transmission of the pulses.

The filter shown in FIG. 5 is particularly adaptable to switching elements in a filter 41, for only the switching of a single element, i.e., $R_f$, is required. That is, the frequency control switch 44 simply switches in different values of $R_f$ to change the frequency of the filter, at the same time being ganged to switch 46 to connect the filter to a different recorder 42 (likely to a different channel or track of a multitrack recorder).

An alternative to the operational filters described is a filtering technique known as delay filtering. Delay filtering may be used to enhance a signal whose frequency and duration is known, as in the case here. It is achieved by recording the unfiltered signal from the transducer 21 and performing repeated additions of the record with successive delays of one period, two periods, three periods, etc. The number of addends is equal to the number of cycles in the original input signal. The delaying may be performed conveniently either by relative drum rotations or by rotation of the recording heads. The original record may be played successively $n$ times onto a second recording medium, where $n$ is the number of cycles in the applied wave train, with a delay of one period between successive records. The $n$ records may each be on a separate recorder track and all tracks may then be read out simultaneously by a single recorder head to provide the required output signal. In the case of an applied wave train $n$ cycles long, the envelope resulting from the addition $n$ times of the record would be triangular with a peak $n$ units high. The length of the envelope would be twice the length of the applied pulse. The resultant signal would be substantially equivalent to the record made on a recorder 42 in the circuit shown in FIG. 2 and may be similarly utilized. That is, the resultant signals for all frequencies may be added together with the same proper phasing. Delay filtering has the advantage that the envelope cuts off sharply outside a time span twice as long as the applied wave train, but it has the disadvantage of requiring more time for processing, as the processing cannot be performed in real time.

An important condition for the successful operation of the apparatus shown in FIG. 2 is that the received wave trains for all frequencies be combined in the time relationship wherein detected wave trains of which the reflections are comprised are all in phase during one cycle of each, more particularly, that they be in phase at the peaks (during the cycle) corresponding to the last half cycle of each wave train. The "time relationship wherein detected wave trains of which the reflections are comprised are all in phase during one cycle of each" means and includes the relationship wherein all of the phase shifts in the system are taken into account.

This is the time relationship where the peak signals of all of the respective signals recorded on the recorders 42 coincide in time were the pulse recognizer 32 to respond to the pulses produced by transducer 21 directly without their transmission through the passage of tube 11. This is achieved by proper setting of the master control system so that each wave train terminates in a final wave at the proper time in the operational cycle of the system, that is, at a particular time after a reference datum or reference time. This reference datum is the reference datum for the recorder 42, and if the final cycle of each pulse train occurs at the proper time interval after the reference datum for each frequency and the reference data for the records made by all of the recorders 42 are made to coincide, the detected waves at the various frequencies will all be in phase at the time corresponding to the receipt of peak the final half cycle of the respective applied wave trains from the various discontinuities.

The records made by the respective recorders 42 are made with coinciding reference data. This may be achieved by suitable programming of the master control system. This setting of the master control system is readily achieved in advance of actual temperature measuring operations by utilizing a test pulse as will be discussed further below.

Figure 6:
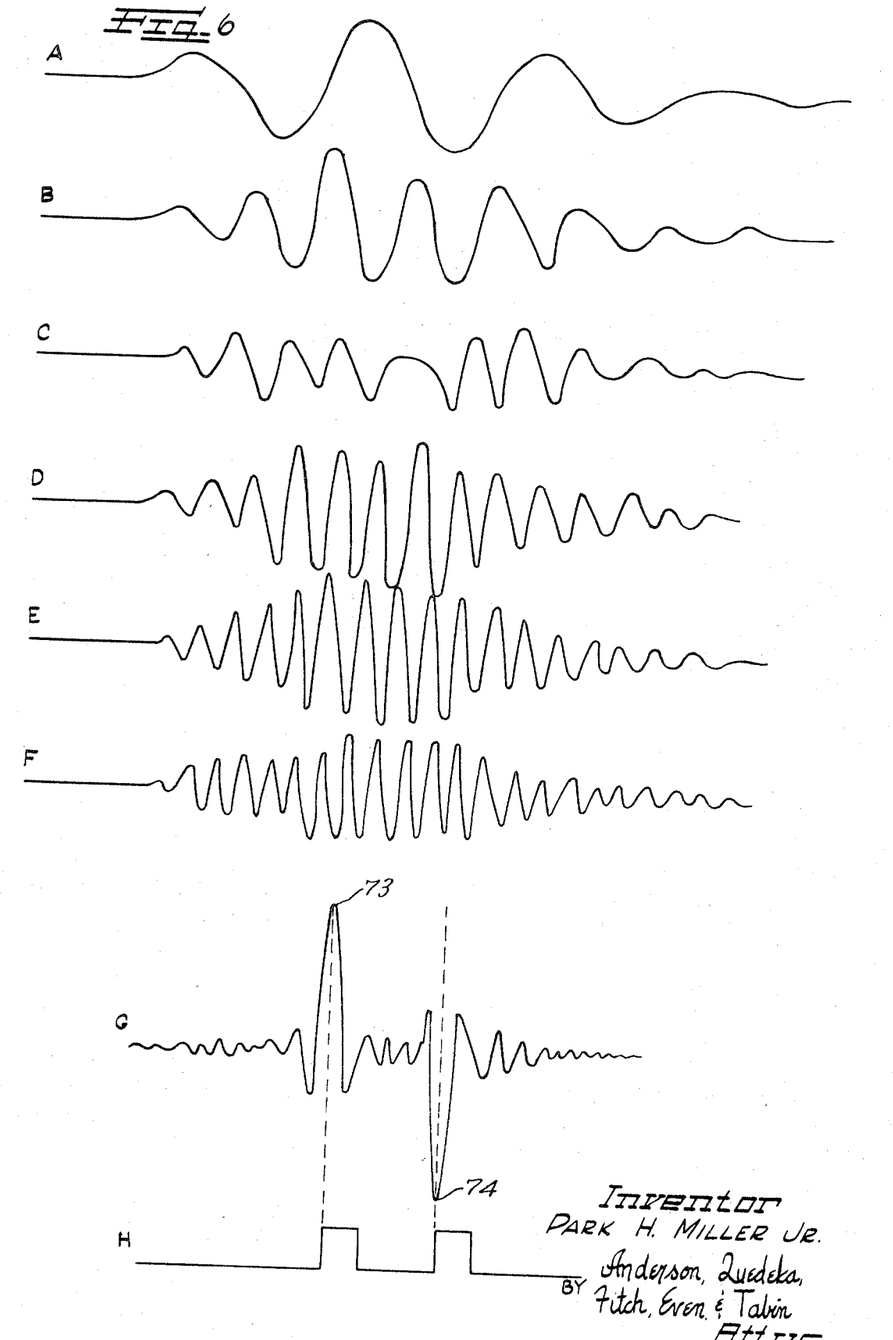
FIG. 6 is a graph illustrating examples of wave forms that may be formed in the apparatus of FIG. 1.

The frequency summation technique is illustrated in FIG. 6. The traces in this picture represent six frequencies of a pulse at 3,600, 3000, 2400, 1800, 1200 and 600 c.p.s., respectively. The records are made on respective recorders 42 are shown as traces A, B, C, D, E and F , respectively. Each of these records is made through the narrow band filter 41 which is switched to be tuned to the respective frequency. The records made on recorders 42 are normally in the form of magnetic records, however, they are shown in FIG. 6 as retranscribed on a recording oscillograph. The summation of signals A, B, C, D, E and F by the readout device 47 is shown as trace G. It will be noted that the two reflections are now readily seen as pulses 73 and 74 and the interval between them is measurable. It is evident that none of traces A, B, C, D, E and F by itself clearly delineates the positions of the reflections. However, the summation record G clearly identifies reflections despite the initial presence of obscuring noise.

The two sharp peaks 73 and 74 in the waveform G correspond to the reflections produced between discontinuities in tube 11 and the interval between the peaks represents the travel time of sound in the gas filled section 13 over twice its length. That is, the reflection produced by the discontinuity at the junction between sections 12 and 13 will precede the reflection produced by the discontinuity at closed end 23 by the time in which it takes sound to travel from the junction of section 12 and 13 to closed end 23 and back to the junction. If the recorder 42 is driven at a constant speed, the interval between peaks 73 and 74 can be measured and used as a measure of time $t$, the time interval between reflections. When the length $L$ of section 13 is known and it can be measured, the velocity $V$ of sound in section 13 can be readily determined in accordance with the relationship $$V = 2L/t$$

This may be substituted in the above equation $$T = V^2 M/\gamma R$$

to provide an indication of the temperature $T$.

There are a number of criteria for obtaining an optimum definition of reflections. It is desirable that this definition be relatively sharp and distinctive. In order that the definition be sharp, it is necessary that the detected wave trains for each reflection reinforce each other over a relatively short period of time and combine destructively over other intervals. It has been discovered that the linear frequency distribution while not the optimum from the point of view of side lobe to peak ratio has generally small enough side lobes to emphasize the principal peak. The largest side lobes are those created by the beat frequency arising from the common frequency difference. However, these side lobes created by the beat frequency can be eliminated by a suitable choice of lengths of wave trains. The side lobes may have a different shape but they nevertheless represent an appreciable bundle of energy. By a linear set of frequencies is meant a number of frequencies having a constant frequency difference between successive frequencies. It does however, include a linear set where one or more of the members of the set are omitted.

The following criteria are helpful in achieving good definition for a set of frequencies:

1. A high average frequency should be used to obtain a high resolution; that is, the higher the frequency used, the sharper the main peak of the summation record.

2. A wide range of frequencies should be employed, ranging from the highest to the lowest values at which good radiation and transmission efficiency are achieved. A wide range is desirable for minimizing the side lobes.

3. A large number of different frequencies is desirable for the general reduction of side lobes. A large number of frequencies has the basic advantage of providing a nearly continuous range of fixed, but closely spaced, frequency wave trains. Dropping out one, or even a few frequencies to avoid particular interfering peaked noises would be possible without too deleterious an effect on the definition. Additional frequency units at either end of the main distribution would enable a selection of the frequency range to fit the particular condition.

4. Generating operational filter outputs of roughly the same amplitude is desirable to achieve a uniform representation of all frequencies in the combined signal. Constant amplitude outputs may be achieved by gain adjustments. The use of a filter having a Q that increases with frequency, e.g., the filter shown in FIG. 5, helps keep up the amplitude of the normally more attenuated signals at the higher frequencies. For optimum signal to noise the Q of the filter should be about three times the number of cycles in a pulse train.

5. For any given upper and lower frequency and number of frequencies there is an optimum frequency distribution which will give the maximum peak to side lobe ratio. While not the optimum, the linear frequency distribution is often employed since the peak to side lobe ratio is satisfactory. With a linear frequency distribution there are also bursts of energies at times $\pm 1/\Delta f$ seconds from the central peak where $\Delta f$ is the constant frequency difference. Thus a large number of frequencies assist in positioning these energy bursts far enough away from the central peaks due to reflections in the thermometer section so that these bursts will not be confused with the two reflections of interest. 6. The frequencies should be selected to avoid any known noise frequencies present in the environment.

In summary, the summation signal peaks have a width determined by the average frequency, and the side lobes are decreased as the range of the frequency increases. The number of frequencies is apparently not critical; however, a larger number reduces the side lobes. The exact value of the frequencies is not critical except that they should be selected so that the signals are never in phase except for one time within the total time spent by the original signals.

Empirical investigation indicates a linear distribution of frequencies to be convenient and satisfactory, although many others are also suitable. A possible unsatisfactory feature of the linear distribution is the existence of two bursts of energy arising from the common difference frequency among the individual frequencies. While these side lobes may be reduced substantially by the filtering process, they are really of no concern in the acoustic thermometer so long as the reciprocal of the difference frequency is large in comparison with the travel time between the two reflectors of interest forming the acoustic thermometer. Since the temperature to be measured is usually known to at least 25 percent by other considerations, it is unlikely that these spurious bursts of energy or side lobes would be confused with the central peaks from the reflectors of interest.

Let us consider a linear distribution of 15 frequencies with a constant frequency interval given by $\Delta f$ c.p.s. When long wave trains of these frequencies are summed together, there will be produced beats at a beat frequency of $\Delta f$. The time interval between the in-phase beat peaks will be $1/\Delta f$.

On a record resulting from the summation of waves of constant amplitude there will appear a series of large in-phase peaks at time intervals of $1/\Delta f$ separated by regions of considerably smaller oscillations due to the addition of the more random phases.

Suppose now that, rather than constant amplitude wave trains, the wave trains after filtering to be combined are of such phase, shape and length that the wave pulse obtained by adding the different trains is centered about an in-phase peak and encompasses a time span for appreciable amplitude of less than $2/\Delta f$, this being the type of wave train existing at the filter output. Thus, there would be produced only one central in-phase peak, with the adjacent in-phase peaks being either absent or of negligible amplitude, and the small oscillations surrounding the single central peak decreasing in amplitude as one goes away from the central peak.

The design criterion that the time span of the summed wave encompasses less than $2/\Delta f$ means, in the case of delay filtering, that the time span of the input pulses to the delay filtering be less than $1/\Delta f$. Elimination of the side lobes would occur in this case. In the case of operational filtering before summing, the criterion would mean that the input pulses to the operational filters would have a time span less than $1/\Delta f$, and further that the decay in the output of the operational filter would fall substantially towards zero within a time of $1/\Delta f$. In the case of operational filtering the side lobe at $1/\Delta f$ seconds later than the main peak would be reduced substantially but not eliminated.

The actual length $L$ of the wave trains may be given by the relationship $$L = n/f$$

where $n$ is the number of cycles per pulse, and $f$ is the frequency in cycles per second. According to the criterion, this length $L$ should be less than $1/\Delta f$. If we let $1/\Delta f = (n+m)/f$ where $m$ is a positive constant not necessarily an integer, then the criterion is fulfilled.

One, among many advantages of a large number of frequencies is that dropping one, or even a few, to avoid particular ambient noise frequencies, would have a small effect on the pulse recognizer output. Also, additional frequency values may be added at either end and the distribution shifted up or down as desired, without serious definition degradation.

Given that the frequencies for the pulse compression have been selected, there remain two adjustments critical to the proper generation of an optimum frequency summation. One of these is the timing of the pulse onset to ensure that the central major peaks of the recorded filter outputs at all frequencies are recorded in-phase for summing. The other is the adjustment of the amplitude of the individual frequencies.

The setting of the pulse onset timing associated with each frequency is quite critical. The onset time is set for each frequency by means of the master control system, as discussed previously. Once this time is determined for a given system, it need not ordinarily be readjusted except possibly for extreme variations in environmental conditions. This onset time must bring the principal, or central, peaks of the operational filter outputs into coincidence. It includes all of the phase shifts present in the system, including the response of the transducer itself. A satisfactory procedure for determining the frequency onset times is by sending a test pulse of a predetermined frequency, passing the received reflections through the regular amplifier with the operational filter 28 tuned to the particular frequency, and recording the filter output on a graph. The procedure is repeated for each pulse and the master time delay settings for the various frequencies are adjusted until the desired frequency peaks line up properly on the graphs. The frequency onset times thus determined may then be used for all subsequent measuring.

The ability to make onset time adjustments for each individual frequency is important since dispersion of the wave as it passes back and forth in the connecting tube will introduce extra time delays which are a function of frequency. These time delays are associated with the effect of viscous drag near the walls and the fact that the walls contain imperfections which act as tiny acoustic cavities. These time delays lower slightly the effective sound velocity, and the effect varies as a function of frequency. In certain methods of performing pulse compression, such as correlation of the original signal sent out by the transducer with the received signals, serious errors may be introduced because of dispersion in the tube 12. These errors may be minimized with the above-described method and apparatus by suitable adjustment of the onset times. The dispersion in the section 13 is relatively negligible.

In one form of apparatus the recorder 30 is of the magnetic drum type having a plurality of recording channels axially displaced along the surface of the drum, and rotating at a constant velocity to provide a recording period of about 0.1 second. A particular point in the recorder cycle may be used as a reference datum or "time zero." This point may be identified and signified by a time marker coupled to the recorder drum, e.g., by a microswitch closing a circuit, which operates at that point in the cycle to produce a reference pulse indicative of the reference datum or time zero. Since all recorder channels are on the same drum, this pulse identifies the same point in the cycle for each channel and hence each signal recorded at a respective frequency. The reference pulse may then be applied to the master control system to initiate its operation. In order that the recorded signals in the respective channels are in the proper relative phase for pulse compression, the beginning of the wave train applied by the transducer 21 may be adjusted relative to the reference datum by a conventional adjustable time delay mechanism such as a monostable multivibrator of adjustable period or an oscillator and counter operated as an electronic clock. A different delay for each frequency ensures that the signals in the respective channels are appropriately timed relative to the reference datum so that the signals of all channels may be summed to provide the compressed pulse as described above. This is because the reference data for the respective channels inherently coincide when all channels are recorded on the same drum. As pointed out earlier, the best results appear to be generated with filter outputs of approximately equal amplitude. A factor of 2 in amplitude has proven tolerable.

The compressed pulse obtained by the frequency-summation procedure has an appearance similar to that of the so-called Ricker Wavelet, recognized as a standard, and to the results obtained by autocorrelation techniques. The high signal-to-noise ratio made available by the narrowband operational filters and the frequency summation process provides a high degree of clarity of the reflection peaks and the possibility of working against strong ambient noise. The flexibility in the choice of frequencies permits the avoidance of strongly peaked ambient noises.

As a modification of the pulse compression scheme just described, the wave trains of different frequencies may be strung together in a single pulse. In such a scheme, the pulse recognizer 32 includes a plurality of narrow band filters, each coupled to amplifier 31 and tuned to a respective one of the frequencies in the pulse. The pulse is transmitted down tube 11 and the reflections produced by the discontinuities are received by transducer 21 and applied through amplifier 31 to the filters of the pulse compressor 32. A recorder is connected to the output of each filter and the arrangement may be the same as that shown in FIG. 2. The output of each filter is therefore recorded in a respective recorder. The wave trains in each pulse are of approximately equal duration and the readout device is constructed in a suitable manner to shift each record back in time an interval equal to $N$ times its length where $N$ equals the number of preceding wave trains in the pulse. Thus the various wave trains are effectively superimposed and read out simultaneously to achieve a wave form like that shown in Trace G of FIG. 6.

In order to provide an indication of velocity, the pulse shaper 33 and the counter 34 may be utilized. Pulse shaper 33 may comprise any suitable circuitry which will produce a square wave pulse, the leading edge of which corresponds to the peak amplitude of the output of pulse recognizer 32. Such a wave form is illustrated by wave form H in FIG. 6 and can be achieved in pulse shaper 33 by differentiation and gating techniques known in the art. Counter 34 is such as to provide a series of pulses of a predetermined frequency and is gated on and off by the square wave output of pulse shaper 33. Accordingly, the time may be readily determined and recorded by counting and recording the number of pulses in each series of pulses put out by the counter 34.

If there is considerable thermal expansion of the section 13 over the temperature range to be measured, the counter may be calibrated to take into account such variation in length.

As noted above, pulse compression may be performed by correlation of the original signal with the received signal. However, when a long section 12 is used to connect the section 13 to the transducer 21, the received signal is distorted because of the dispersion in the section 12. Then the compressed pulse no longer has the optimum signal to noise ratio and the peak to side lobe ratios become much smaller.

On the other hand, the time between the two reflections may be determined by autocorrelating the received signal with itself in a method to be described shortly wherein any dispersive effects are negligible. An advantage of this autocorrelation technique is that if there is any dispersion in the section 12 connecting the section 13 to the transducer 21, any of the time delays which are a function of frequency in the received signals are virtually identical for both reflections, since the dispersion within the section 13 is negligible.

To perform this method for determining the interval between reflections produced by the transmitted pulse of transducer 21 under adverse noise conditions, a series of randomly spaced pulses, which need not be similar but should possess a large high frequency content, are produced by pulse generator 25 and converted into sound signals by transducer 21. In fact, white random noise covering the spectrum from low-audio frequencies up to a frequency which is many times the reciprocal of the time between reflections at the junction of sections 12 and 13 and the end 23 of the section 13, is the preferred source. The sound pulses are sent down the tube 11 over a time interval which permits the pulse to be reflected by each of the discontinuities in tube 11 and received by transducer 21 prior to the production thereby of the next succeeding pulse.

Figure 7:
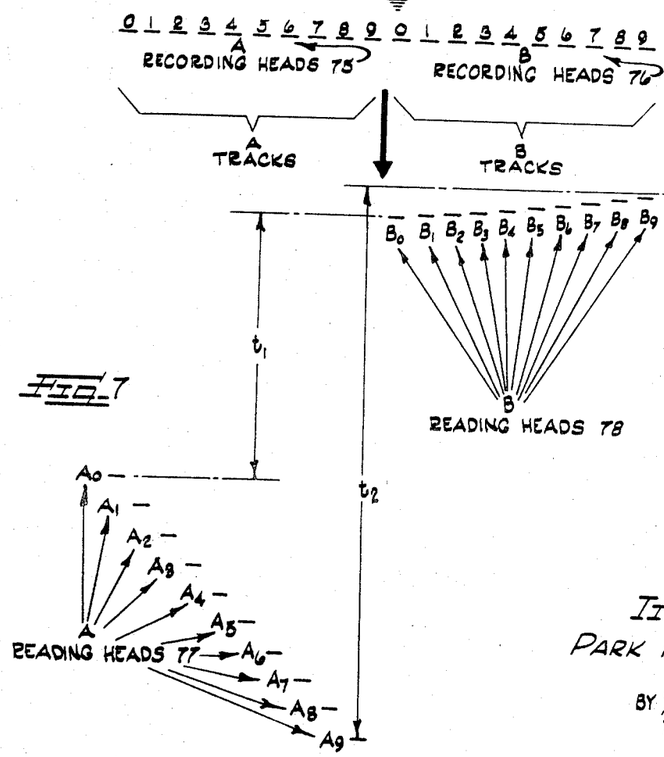
FIG. 7 is a schematic diagram of apparatus used to measure time delays through autocorrelation techniques.

As shown in FIG. 7 the received signals are recorded on each of the tracks of a multitrack recorder. The tracks may be divided into two groups designated as "A" tracks and "B" tracks respectively. As shown, these may be, for example, 10 A tracks and 10 B tracks moving in the direction of the arrow. There may be, as shown, separate but parallel A recording heads 75 for each A track or a single-recording head may be used to record the same signal on all A tracks at once. B recording heads 76 are similarly disposed on the B tracks. Along each A track is disposed a corresponding A reading head 77 displaced along the track a predetermined distance from the corresponding A recording head 75. B recording heads 78 are also disposed along the B tracks at predetermined distances from the B recording heads 76. By correlating the signal from each of the A reading heads 77 with the signal from each of the B reading heads 78, the original signal is autocorrelated with itself after a number of different time delays corresponding to the relative spacing of the reading heads along the tracks. For the greatest sensitivity with a given number of channels, these spacings should cover only the range of interest, additional spacings being unfruitful.

For example, if the time between reflections at the highest temperature of interest is $t_1$ and the time between reflections at the lowest temperature of interest is $t_2$, only relative spacings corresponding to times between $t_1$ and $t_2$ are required. To cover this range, the A reading heads 77 may be relatively spaced a distance corresponding to $(t_2-t_1)/10$ and the B reading heads 78 may be relatively spaced a distance corresponding to $(t_2-t_1)/100$. The respective A and B reading heads which are closest to one another along the direction of movement of the track are designated as $A_o$ and $B_o$, respectively, and are spaced from one another by a distance corresponding to $t_1$. All of these distances along the tracks are related to the corresponding times by the velocity of the recorder drum; i.e., linear distance divided by linear velocity equals time. If the velocity of the drum is kept constant, the distances may be directly measured as a measure of time.

The problem then is to determine the relative spacing of A and B heads that places the second reflection as recorded on a B track in registration with the first reflection on an A TRACK. This may be achieved by autocorrelation wherein each of the signals from the A reading heads 77 are multiplied by each of the signals from the B reading heads 78.

To perform this autocorrelation, the outputs of the reading heads 77 are connected to 100 multiplying circuits which form the product of $A_j$ and $B_j$, where $A_j$ and $B_j$ are the signals from respective A and B reading heads, there being 100 possible combinations. The output of each multiplying circuit is fed into an integrating circuit with a predetermined time constant. This time constant is selected to be at least 10 times the travel time of sound wave from the transducer to the cavity and back again, but shorter than the time constants associated with any temperature transients which one would wish to follow in the environment being monitored. The longer the time constant, the greater the enhancement of the signal with respect to the noise background.

The outputs of the 100 integrating circuits are examined periodically to see which one has the largest output, and the time associated with this circuit is recorded as a measure of the temperature in the cavity. For example, utilizing the relative spacing of A and B heads illustrated in FIG. 7, if the product of $A_3$ and $B_4$ produced the largest autocorrelation signal, the time $t_{34}$ associated therewith is:

$$t_{34}=t_1+0.34\,(t_2-t_1)$$

This time may be converted into a temperature measurement in the same manner as the times as determined by the pulse compression techniques described above.

Alternatively a display similar to that used in pulse height analyzers could be used to show the whole autocorrelation function in a continuous manner and one could visually select the channel with the largest amplitude.

By such autocorrelation techniques it is possible to determine the position of the peak of the autocorrelation function to better than one-tenth of the width of the autocorrelation function at the base line, which in turn is the reciprocal of twice the band width of the white noise. If one desires a 2 percent accuracy in the measurement of temperature, one needs 1 percent accuracy in measuring time. For example, using a section 13 1 meter long containing helium to measure temperatures of the order of 1,200°C, where the velocity of sound is about 2,000 m./sec., the two reflectors will be separated in time by about one ms, so that the position of the peak must be determined to 0.01 ms., and the band width of the random noise should be from a low-audio frequency to at least 5,000 c.p.s.

The present invention has a number of significant advantages. Among these advantages is the fact that ambient noise reflections from other obstacles in the sound conducting tube, and nonlinearity in the electronic components will not affect the pulse recognition. A much less critical approach to the geometry of the sound conducting tube 11 is required than has been the case in connection with previous acoustical thermometers.

The system requires only a single sound conducting tube, the dimensions of which may be proportioned such that the tube will fit within spaces which are quite limited in size. For example, in a nuclear reactor, the tube may be proportioned to slide into space which is normally occupied by one of the reactor fuel elements. Because the reflections occur as the pulse enters section 13 and as the pulse strikes the closed end of section 13, the time between pulses is the time it takes sound to travel twice the length of section 13. This means the length of section 13 need only be half the sound travel distance desired between reflections. A tube wherein the section 13 is about one meter in length is satisfactory. The basic measurement in the system is a time difference between reflections, and such a measurement lends itself readily to automatic recording. The system offers a high degree of accuracy notwithstanding adverse noise conditions in its environment. By using graphite for the tube and helium gas inside the tube, the thermometer is substantially unaffected by high heat, nuclear radiation and the like.

Various modifications of the invention will be apparent to those skilled in the art from the foregoing description, and such modifications are intended to fall within the scope of the appendant claims.

I claim:

1. A method for acoustically determining the temperature of a sound conducting fluid in the presence of ambient noise, comprising, transmitting a plurality of pressure pulses through the fluid at each of a plurality of predetermined frequencies, causing each pulse to be reflected at points a predetermined distance apart, detecting the reflections of each of said pulses together with the ambient noise and producing a plurality of electrical signals each representative of the reflections of a respective one of said pulses, filtering each of the electrical signals with a filter tuned to a respective one of said frequencies, making an individual record of each of the filtered electrical signals representative of the respective pulses, shifting the time of the respective records by an amount which corresponds to the difference in time between the last half cycle in each pulse and a fixed time reference datum so that the peak amplitudes of the filtered electrical signals recorded, disregarding the presence of ambient noise, line up, reading out the shifted records simultaneously such that the signal read out includes two peaks representative of the time of the two reflections, and, from the interval between the two peaks, determining the temperature in the fluid between the points of reflection.

2. A method according to claim 1 wherein the pressure pulses are at each of a plurality of predetermined frequencies selected so that the signals are in phase during only one-half cycle.

3. A method according to claim 2 wherein the pulses are of equal duration and strung continuously together in time, and wherein the shifted amount for each pulse corresponds to N times its length where N equals the number of preceding wave trains in the pulse.

4. Apparatus for acoustically determining the temperature of a sound conducting fluid in the presence of ambient noise, comprising means for transmitting a plurality of pressure pulses through the fluid at each of a plurality of predetermined frequencies, means for reflecting each pulse at points a predetermined distance apart, means for detecting the reflections of each of said pulses together with the ambient noise and producing a plurality of electrical signals each representative of the reflections of a respective one of said pulses, means for filtering each of the electrical signals with a filter tuned to a respective one of said frequencies, means for recording each of the filtered electrical signals representative of respective pulses, means for shifting the time of the respective records by an amount which corresponds to the difference in time between the last half cycle in each pulse and a fixed time reference datum so that the peak amplitudes of the filtered electrical signals recorded, disregarding the presence of ambient noise, line up, means for reading out the shifted records simultaneously such that the signal read out includes two peaks representative of the time of the two reflections, and means for indicating the temperature in the fluid between the points of reflection in accordance with the interval between the two peaks.

5. Apparatus according to claim 4 including means for adjusting the on-set times of each of the pulses in relation to the fixed time reference datum.

6. A method for acoustically determining the temperature of sound conducting fluid in the presence of ambient noise, including the following steps, transmitting a plurality of randomly spaced pressure pulses through the fluid, causing each pulse to be reflected at points a predetermined distance apart, detecting the reflections of each of said pulses together with the ambient noise and producing a plurality of electrical signals each representative of the reflections of a respective one of said pulses, recording each of the received signals, reading out the recorded signals in pairs with a number of different time delays spaced over a time range, and multiplying one of the read out signals with the other of the read out signals in each pair for each different time delay, the largest one of the multiplied products thereby being indicative of the signal combination representing the temperature of the sound conducting fluid.

7. A method according to claim 6 wherein each of the received signals is recorded on a respective track on a multitrack recorder in two groups of tracks, and wherein the time range corresponds to the temperature range of interest, and wherein the read out recorded signals in each pair are from respective groups of tracks.

8. Apparatus for acoustically determining the temperature of a sound conducting fluid in the presence of ambient noise, comprising, means for transmitting a plurality of randomly spaced pressure pulses through the fluid, means for reflecting each pulse at points a predetermined distance apart, means for detecting the reflections of each of said pulses together with the ambient noise and for producing a plurality of electrical signals each representative of the reflections of a respective one of said pulses, multitrack recording means for recording each of the received signals in two groups of tracks, means for reading out each recorded signal after a number of different time delays spaced over a time range between pairs of tracks of different groups corresponding to the temperature range of interest, means for multiplying each of the read out signals on the tracks of one group with each of the read out signals on the tracks of the other group, and means for indicating the largest one of the multiplied products, thereby indicating the signal combination representing the temperature of the sound conducting fluid.